United States Patent [19]

Miller et al.

[11] Patent Number: 5,538,744
[45] Date of Patent: Jul. 23, 1996

[54] RIDGED DOUGH STRUCTURE AND METHOD OF MAKING THE RIDGED DOUGH STRUCTURE

[75] Inventors: Dianne M. Miller, Andover; Simon A. Almaer, Plymouth, both of Minn.; Jeremy A. Heintz, Germantown, Wis.

[73] Assignee: The Pillsbury Company, Minneapolis, Minn.

[21] Appl. No.: 393,091

[22] Filed: Feb. 22, 1995

[51] Int. Cl.⁶ .................................................... A21D 8/02
[52] U.S. Cl. .......................... 426/94; 426/138; 426/143; 426/144; 426/249; 426/282; 426/283; 426/284; 426/446; 426/516; 426/549; 426/556; 426/808
[58] Field of Search ................................ 426/94, 283, 144, 426/291, 549, 653, 516, 282, 264, 138, 143, 249, 556, 557, 560, 446, 451, 808

[56] References Cited

U.S. PATENT DOCUMENTS

| | | | |
|---|---|---|---|
| 3,956,517 | 5/1976 | Curry et al. | 426/502 |
| 4,170,659 | 10/1979 | Totino et al. | 426/95 |
| 4,563,358 | 1/1986 | Mercer et al. | 426/89 |
| 4,606,923 | 8/1986 | Ricke | 426/496 |
| 4,680,191 | 7/1987 | Budd et al. | 426/439 |
| 4,855,151 | 8/1989 | Fielding | 426/144 |
| 4,973,481 | 11/1990 | Hunt et al. | 426/144 |
| 5,104,667 | 4/1992 | Moeller | 426/144 |
| 5,234,705 | 8/1993 | Mani | 426/496 |
| 5,417,150 | 5/1995 | Kordic | 99/432 |

*Primary Examiner*—Esther M. Kepplinger
*Assistant Examiner*—Lien Tran
*Attorney, Agent, or Firm*—Janal M. Kalis; Aleya Rahman

[57] ABSTRACT

A ridged dough product is made by a method for making a ridged dough. The method includes preparing a dough and processing the dough with a means for providing ridges and valleys on the outer surface of the dough, such as a die. The ridged dough product exhibits a moisture gradient across the thickness of the dough.

27 Claims, 4 Drawing Sheets

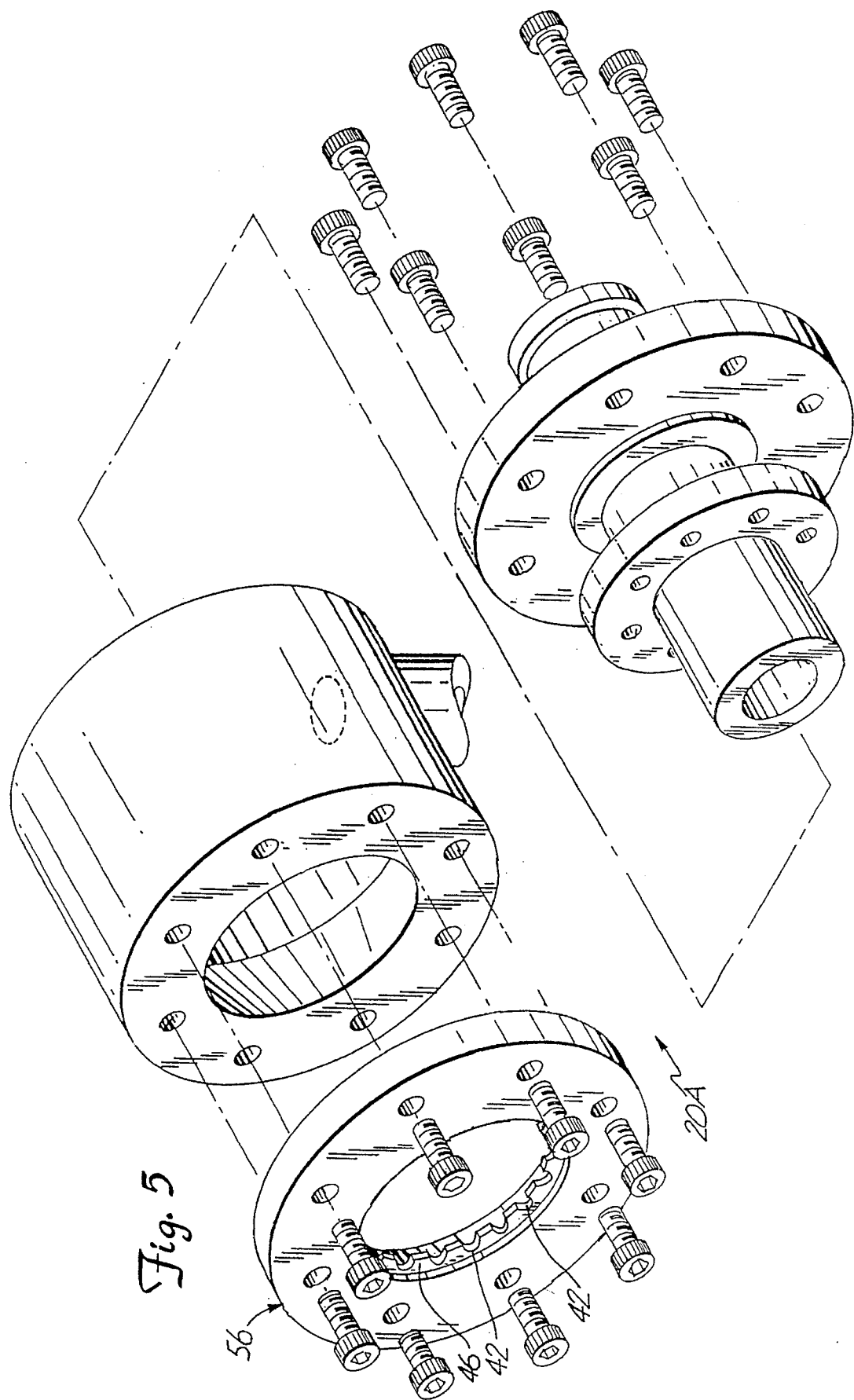

RIDGED DOUGH STRUCTURE AND METHOD OF MAKING THE RIDGED DOUGH STRUCTURE

BACKGROUND OF THE INVENTION

The present invention relates to an edible dough with ridges and a method for making the ridged dough.

Food manufacturers have made advances over the past two decades in the mass production of composite foods. Composite foods are foods having at least two components. Typically, the components have different textures, different moistures and, frequently, different phases.

For one type of composite food, one component encloses another component. This type of composite food includes filled foods such as dough-enrobed pies or rolls. The filled foods include a filling such as egg roll ingredients, pizza ingredients, burrito ingredients, casserole ingredients, pie ingredients or any other sweet or savory food filling, and an outer edible container that contains the filling. Both of the components may be cooked once the composite food is formed. The filled composite foods are frequently prefrozen and are made ready to serve by a consumer, usually by reheating.

One problem that has plagued manufacturers of filled composite foods, particularly frozen filled foods, is migration of moisture from the filling to the edible food container. Much of the migration occurs when the frozen food is reheated by the consumer or becomes thawed during distribution. The moisture migration tends to undermine the textural integrity of the edible food container. In particular, the edible food container becomes soggy.

The Totino et al. patent, U.S. Pat. No. 4,170,659, issued Oct. 9, 1979, describes a pizza crust that is made from a fried dough body. The crust includes dome shaped blisters. The blisters are each partially separated from the dough body by a cavity. The dough body is fried in a manner that concentrates fat at an outer surface of the dough body.

The Ricke patent, U.S. Pat. No. 4,606,923, issued Aug. 19, 1986, describes a pizza dough that is embossed with a grid of intersecting lines. The intersecting lines create regular blisters in the dough. The lines are added to decrease delamination of the dough.

The Mani patent, U.S. Pat. No. 5,234,705, issued Aug. 10, 1993, describes a method of making pita bread with a roller having a wavy pattern. The roller shapes a bread dough to have a middle thickness that is thinner than an outer edge thickness.

The Hunt et al. patent, U.S. Pat. No. 4,973,481, issued Nov. 27, 1990, describes a corrugated chip dough. The corrugated dough is deep fried to make a chip having a strength that can withstand dipping. Grains used to make the dough include corn-based grains and potato-based grains. A corrugated pattern described is a waffle-shaped pattern.

SUMMARY OF THE INVENTION

The present invention includes an edible ridged dough and a method for making the ridged dough. The method includes preparing a dough and processing the dough with a means for providing ridges and valleys on the outer surface of the dough. One such means includes a die having a pattern of grooves arranged in the die. The die forms ridges at the grooves on the outer surface of the dough as the dough passes through the die to form the ridged dough.

BRIEF DESCRIPTION OF DRAWINGS

FIG. 5 is a perspective view of one embodiment of the die of the present invention.

DETAILED DESCRIPTION OF PREFERRED EMBODIMENTS

The present invention includes a method for making a ridged dough that includes preparing a dough and processing the dough with a means for providing ridges and valleys on the outer surface of the dough. One means is a die which can form a dough with an outer ridged surface by extruding the dough through the die. The die has an inner surface with a pattern of grooves arranged in the inner surface so as to form the ridges at the grooves on the outer surface of the dough. The present invention also includes a method for making a reheatable, coextruded filled dough product that includes coextruding a filling and a dough to form ridges and valleys in the dough and cooking the filled dough product. Once the ridged dough product is cooked, it forms a ridged crust product containing a filling.

Figure 1:
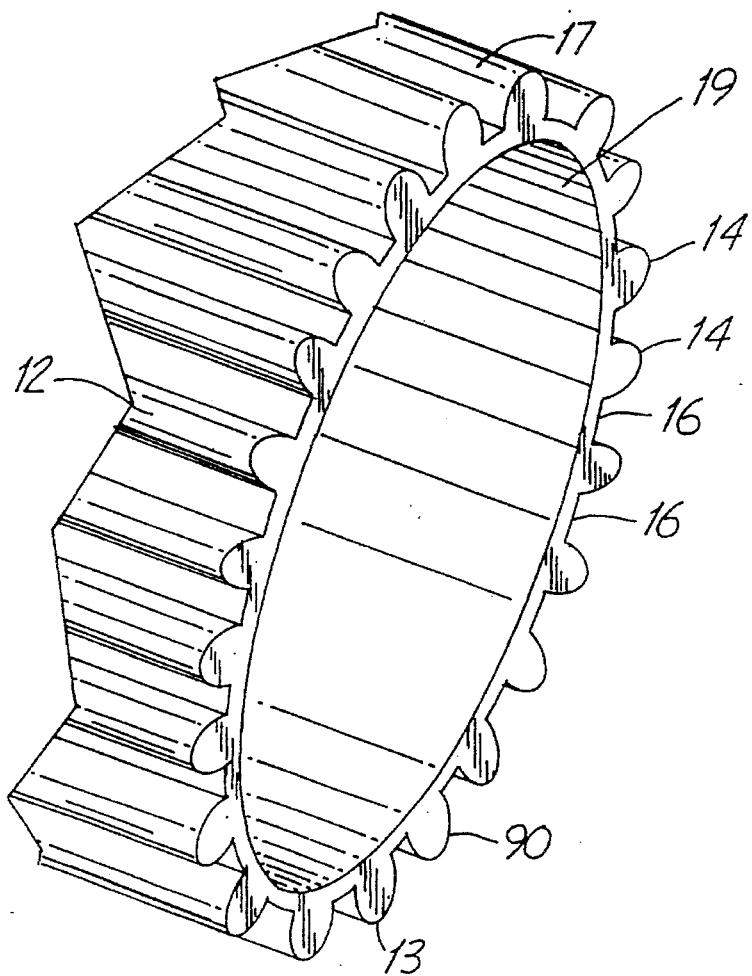
FIG. 1 is a plan view of one embodiment of an unfilled dough product of the present invention.

The present invention further includes the ridged dough 12, illustrated in FIG. 1. The dough 12 includes a main body 13 with ridges 14 and valleys 16. The present invention also includes a filled ridged dough product, illustrated at 10 in FIG. 2. The product 10 includes the ridged dough 12 with ridges 14 and valleys 16 and a filling (not shown) contained within ridged dough 12. The ridged dough 12 may be cooked to form a ridged crust.

Figure 3:
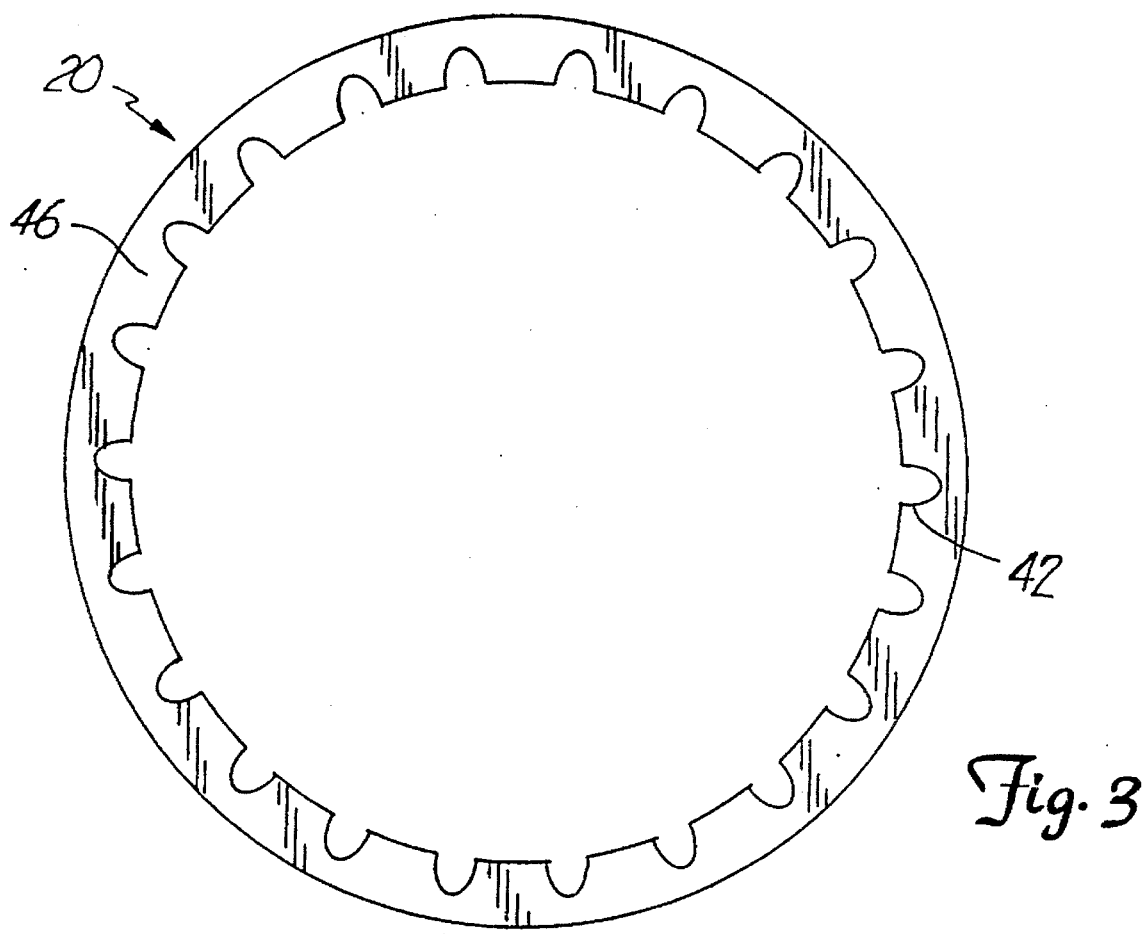
FIG. 3 is a cross-sectional view of one embodiment of a die of the present invention.

The present invention additionally includes a die, illustrated at 20 in FIG. 3, for making the ridged dough 12 by extrusion. The die 20 has an inner surface 46 with a pattern of grooves arranged in the inner surface 46 of the die 20 so as to form the ridges at the grooves on the outer surface of the dough.

Figure 2:
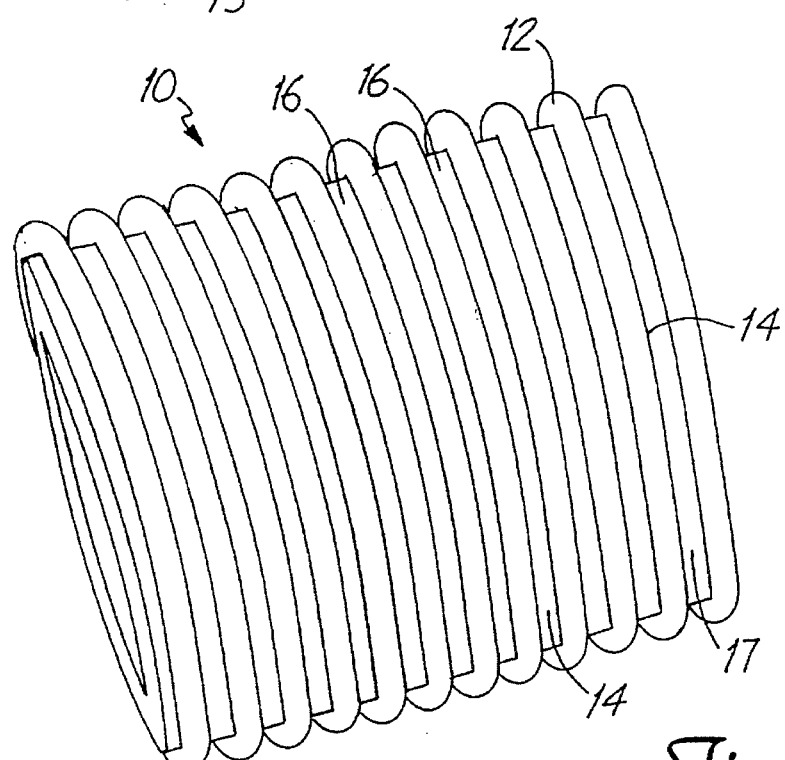
FIG. 2 is a plan view of one embodiment of a filled dough product of the present invention.

While the ridges shown in FIGS. 1 and 2 are linearly arranged with respect to each other, it is understood that the ridges may have other arrangements, such as diagonal alignment and may be separated by irregular distances. The number and positioning of the ridges may be varied depending on factors such as the desired crust texture or thickness or the desired size, shape or appearance of the product. Configurational variations due to cutting, crimping or otherwise processing the product are not shown in the figures in order to more clearly depict the ridged surface.

The ridges 14 increase the surface area of the dough 12 as compared to a dough lacking ridges. The increased surface area of ridged dough 12 permits greater moisture loss from the dough when it is cooked, since more of the dough's surface is subjected to heat energy. The increased moisture loss from the ridged dough 12 during cooking results in a crust having a more rigid or crisp texture. As the surface area of dough 12 increases, the rigidity or crispness of the crust generally increases. The ridges 14 can increase the surface area by any amount depending on the desired crust texture, thickness, shape, size and overall appearance of the cooked product. Preferably, the surface area of the dough 12 is increased by between about 10% and 200%, more preferably by between about 20% and 100%. In one preferred embodiment, the surface area of dough 12 is increased by about 35 to 45%.

Referring to FIG. 1, the cross-sectional area of the dough is defined by the sum of the area of main body 13 and the area of ridges 14. It is not necessary in the present invention that the cross-sectional area of the dough, or in other words, the total amount of dough, be increased as compared to a conventional dough in order to obtain an increase in rigidity or crispness. It is the distribution of the dough into ridges and valleys that provides the increased rigidity or crispness. In a preferred embodiment, up to about 95% of the cross-sectional area of the dough is in the form of ridges 14, more preferably between about 55% to about 85%, each ridge being measured from the top of ridge 14 to inner surface 19. The present invention, therefore, permits a ridged product to be made having the same total amount of dough as a conventional unridged product, but with a surprisingly increased crispness or rigidity when compared to the unridged product.

The ridges 14 impart to the dough 12 a variable cross-sectional thickness. The variable cross-sectional thickness and ridged, thicker region of the dough 12 provide a physical impediment to moisture migration from the filling to outer surface 17, particularly when the filled product 10 is cooked and then subjected to distribution stresses such as thawing and refreezing or is stored frozen and reheated by the consumer. Because ridges 14 in dough 12 are thicker than valleys 16, moisture from the filling has a greater distance to migrate to reach outer surface 17 at each ridge 14 and may not reach the outer surface 17 when subjected to distribution stresses or during reheating. The variable cross-sectional thickness amplifies the textural differences between outer surface 17 and inner surface 19 of the ridged dough after it has been cooked, imparting a crisper texture to outer surface 17 and providing a tender texture to inner surface 19. The textural differences that develop during cooking are retained in the dough product even after reheating the product or subjecting it to distribution stresses.

By alternating ridges 14 with valleys 16 in the ridged dough 12, the dough 12 acquires an improved rigidity when cooked. The improved rigidity permits easier handling of the cooked product and provides additional strength to the crust, as compared to an unridged dough product. Additionally, dough 12, upon being fried, exhibits reduced undesirable blistering or delamination on the surface due to the disruptions in surface smoothness caused by ridges 14.

In one preferred embodiment of the ridged dough 12 as shown in FIG. 1, the ridge-to-valley height ratio, which compares the thickness of a ridge, defined as the distance between the top of ridge 14 to inner surface 19, to the thickness of a valley, defined as the distance between the top of valley 16 and inner surface 19, is between about 1.5:1 to 8:1, more preferably between about 2:1 and 6:1. The ridges are shown in the figures to have a generally half-elliptical shape in cross-section, although the ridges can have any desirable shape such as triangular, square or rectangular.

In another preferred embodiment, the surface area of the ridged dough is increased by between about 35–45% as compared to the same amount of an unridged dough, the cross-sectional area of the dough that is in ridge form is between about 55–85% of the total dough cross-sectional area and the ridge-to-valley height ratio is between about 3.5:1 to 4.5:1.

Cooked filled dough products having unridged, uniform crusts do not have significant variations in the cross-sectional thickness of the dough crust. Consequently, it is difficult to establish a moisture gradient between an inner crust in contact with the filling and the outer crust. As a result, the crusts of conventional dough-enrobed filled products become soggy throughout. It is believed that the ridged dough 12 of the present invention, when cooked, has a glassy outer surface 17 that significantly increases the crispness of the cooked dough crust. The crispness is maintained even when the cooked dough crust contains a moist filling.

In addition, because cooking the ridged dough of the present invention creates a moisture gradient between the inner and outer surfaces, the adhesion of coating materials, such as but not limited to sugar, cheese, spices, crisping agents, browning agents or flavoring agents, is improved as compared to unridged dough products. Since moisture migration to the outer surface of the ridged dough of the present invention is restricted, coating materials do not significantly absorb moisture from the dough's outer surface, which prevents the coatings from dissolving, separating, clumping, sloughing off, or otherwise being adversely affected by the excess moisture. Furthermore, because the cross-sectional thickness of the ridged dough varies, the coating material is less affected by abrasive stresses that could rub off the coating from the outer surface of the dough since the valleys and sides of the ridges are not as readily susceptible to abrasion as an unridged surface.

In one preferred embodiment, the ridged dough 12 has a tubular cross-section. The ridges 14 are positioned concentrically about the tubular-shaped dough 12. Specifically, the ridges 14 are positioned on the outer annular surface 17 of the tubular-shaped dough 12, as shown in FIG. 1. In one embodiment, the ridges on the dough tube have a ridge distance-to-width ratio of between about 1.5:1 to 8:1, preferably 2.5:1 to 5:1, the ridge distance-to-width ratio being defined as the ratio of the distance between the centers of adjacent ridges to the width of one ridge.

It is not necessary for the present invention, however, that ridges be uniformly separated, or that the dough 12 have a particular number of ridges, so long as the ridges increase the surface area of the dough and provide cross-sectional variation by distributing the dough into ridges and valleys, as compared to an unridged dough.

Figure 4:
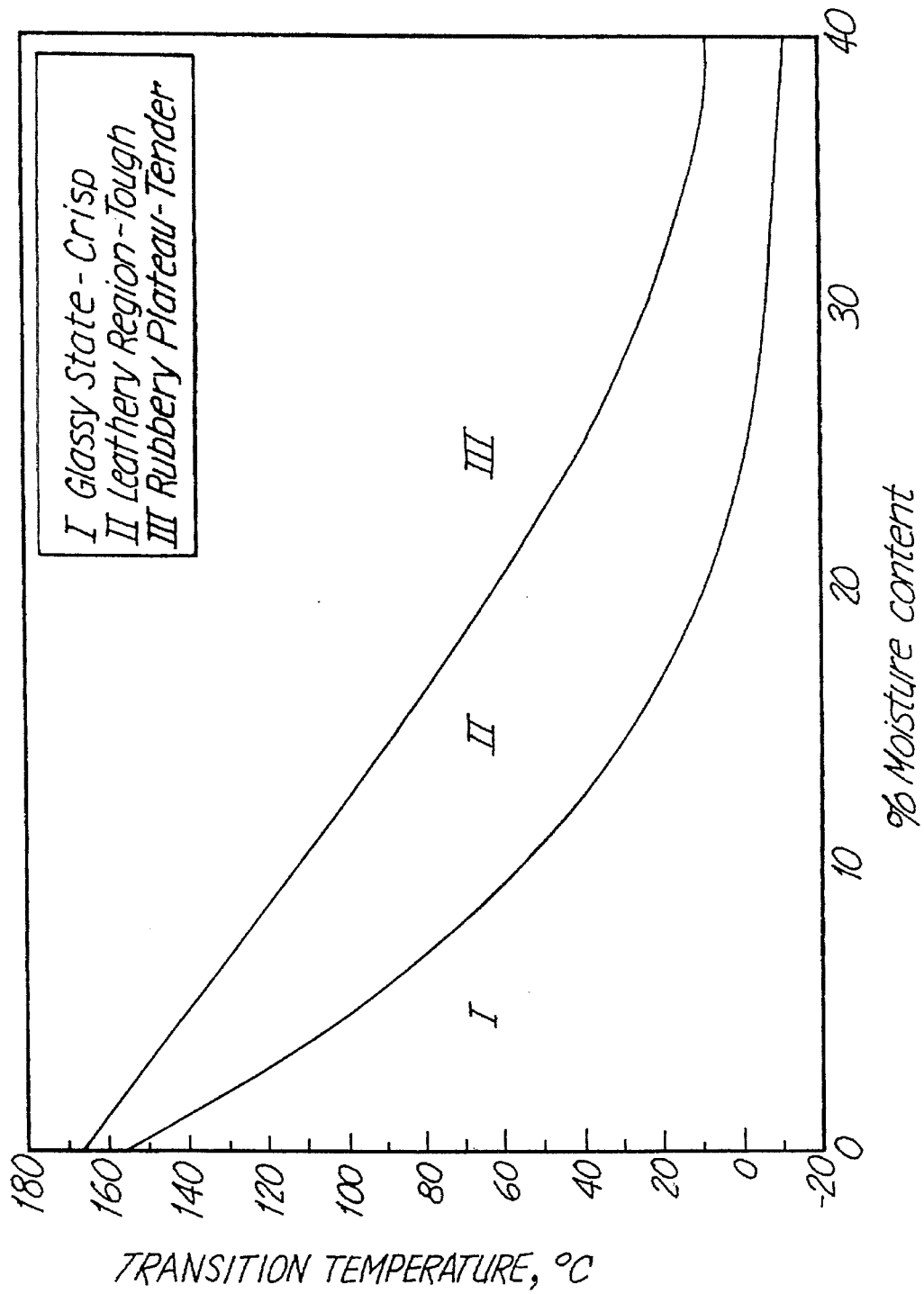
FIG. 4 is a graphical view of phase transition temperature versus moisture content for one embodiment of the dough product of the present invention.

A phase diagram of phase transition temperature versus moisture content, illustrated in FIG. 4, is applicable to food biopolymers, including starch and gluten. Dough contains starch and gluten, and may contain other food biopolymers depending on the dough formulation. The phase diagram shows three regions of physical properties for food biopolymers having moisture contents and transition temperatures within the ranges described.

In Region I, biopolymers are in a glassy state. Biopolymers in cooked dough crusts impart a crispy texture when in a glassy state. In Region II, biopolymers are in a leathery state. Dough products in Region II have a tough texture. Region III is a rubbery plateau. Dough products in Region III have a tender texture. It is desired that at least the outer surface 17 of dough 12 of the present invention be approximately in a glassy state in Region I. It is additionally desired that the inner surface 19 be approximately in the rubbery plateau in Region III.

As an example of the present invention, at a typical consumption temperature of 55 degrees Centigrade, the moisture content of a biopolymer must be about 10% by weight or less to be in the glassy state in Region I and about 25% or more by weight to be in the rubbery plateau in Region III. As described in one embodiment, a ridged dough 12 of the present invention, when cooked, has a crisp outer surface 17 and a tender inner surface 19 when reheated to about 55 degrees Centigrade because the moisture content of the outer surface 17 places it approximately in the glassy region and the moisture content of the inner surface 19 places it approximately in the rubbery region.

The dough 12 of the product of the present invention 10 may be made by any conventional recipe. In one embodiment, the dough has a moisture content within a range of about 20 to 35 percent by weight. The dough 12 may be made with any conventional flour including wheat, corn, oat, soy and so on.

Preferably, the dough 12 is made from about 60 to 80 weight percent flour, 15 to 30 weight percent water, 0 to 7 weight percent fat or oil and 0 to 1.5 weight percent of an emulsifier. Additional ingredients in amounts ranging from 0 to 20 weight percent may be added to enhance the flavor or other organoleptic qualities of the product. Additional ingredients include flavoring agents, coloring agents, preserving agents, stabilizing agents, fortifying agents, dough conditioners, protein, fat, water binding agents, leavening agents, browning agents, crisping agents, bulking agents and the like. The flour used in the present invention preferably has a protein content of about 10 to 20 percent, more preferably 12 to 14 percent.

The ridged dough 12 may be cooked by any conventional method to form a crust of the present invention. Suitable methods include frying the dough in oil to make the cooked crust and also include baking the dough. Since no fat or oil is typically added to dough while baking, preferably a dough formulation with a higher fat or oil content is used if the dough is to be cooked by baking.

After being cooked, the crust product can be frozen and stored for later reheating and consumption. The product can be reheated using any conventional method, such as by heating in a conventional oven or by subjecting the product to microwave energy. Preferably, the dough is first cooked by frying in oil, then reheated in a conventional oven.

A dough of the present invention can optionally be filled with a filling prior to being cooked to form a filled dough product. The filling material can be added to the dough before, during or after the dough is processed with the means for providing ridges. Any type of sweet or savory filling ingredients can be used, such as egg roll ingredients, pie ingredients, pizza ingredients, burrito ingredients and casserole ingredients. The ridged dough of the present invention is particularly well-suited for moist fillings having relatively high water activities since the ridges maintain the moisture gradient between the filling and the outer surface of the dough.

EXAMPLE I

A fried ridged dough product of the present invention was compared to an unridged fried dough product. The ridged and unridged products were each made with a dough made from about 69 wt-% hard red spring wheat flour, about 26 wt-% water, about 2 wt-% soybean oil, about 1 wt-% egg yolk emulsifier, about 1 wt-% sugar and about 1 wt-% whey and soy protein, and were each filled with the same filling having a water activity of about 0.98. The ridged product of the present invention was extruded through a grooved die, thereby creating ridges on the dough surface, while the unridged control product was extruded through a conventional die without grooves. The total cross-sectional area of the dough tube was the same for the ridged dough product and the unridged product, but about 83% of the cross-sectional area of the ridged dough product was in the form of ridges. The products were fried in oil, frozen and subjected to six freeze-thaw cycles in which the frozen products were allowed to completely thaw at about 40° F. and were then refrozen. The products were then reheated in a conventional oven at about 425° F. for about 7–8 minutes. A trained sensory panel evaluated the products and scored them for various characteristics on a 0 to 60 scale. Table I shows the results of this evaluation which were determined to be significant at a 95% confidence level:

TABLE I

|  | Ridged Product | Unridged Product |
| --- | --- | --- |
| Initial Crispness (low–high) | 22.71 | 9.83 |
| Sustained Crispness (low–high) | 27.21 | 13.58 |
| Rigidity (low–high) | 37.79 | 26.79 |
| Hardness (Initial Bite) (low–high) | 20.29 | 15.54 |
| Moistness of the Mass (low–high) | 24.54 | 31.46 |

The ridged dough product of the present invention performed better than an unridged product on these attributes which are typically associated with a crisper or more rigid product.

The die of the present invention can be any conventional die having an inner surface 46 such as shown in FIG. 3. Although the cross section of the die shown in FIG. 3 is circular, the die may be of any desired shape or size. Inner surface 46 has a pattern of grooves 42, which can be arranged in any desired pattern and distribution, and are shown in FIG. 3 to be concentrically arranged and evenly distributed along the inner surface 46. Grooves 42 can be of any geometric configuration, and are shown in FIG. 3 to be half-ellipsoidal in cross-section.

In one preferred embodiment of the die, the grooves 42 are arranged to have a groove distance-to-width ratio of between about 1.5:1 to 8:1, preferably 2.5:1 to 5:1, the groove distance-to-width ratio being defined as the ratio of the distance between the centers of adjacent grooves to the width of one groove.

It is not necessary for the present invention, however, that the grooves be uniformly separated, or that the die 20 have a particular number of grooves, so long as the grooves increase the surface area of the dough and provide cross-sectional variation by distributing the dough into ridges and valleys, as compared to an unridged dough.

In another embodiment of the die, up to about 95% of the cross-sectional area of the dough extruded from the die is in the ridges. Preferably, between about 55% and 85% of the cross-sectional area of the dough extruded from the die is in the ridges.

One embodiment of the die of the present invention is illustrated at 20A in FIG. 5. The die 20A includes face plate 56 having inner surface 46. The inner surface 46 has a pattern of grooves 42, which are shown in FIG. 5 to be half-elliptical in cross-section, but which may be of any geometric configuration desired such as triangular, square or rectangular. FIG. 5 shows a removable face place 56, which is described in copending patent application U.S. Ser. No. 08/270,346 and is owned by the assignee of the present application. While the removable face plate 56 is shown, it is understood that any conventional die can be suitably modified for use as the die of the present invention.

The die embodiment 20 creates the ridged tubular dough such as is shown at 12 in FIG. 1. However, the ridged dough 12 can have any shape in addition to tubular and may be made using techniques other than extrusion through a die, such as by sheeting a dough and rolling a pattern of ridges on the dough surface using a grooved dough roller, or by stamping a pattern of ridges onto the dough surface. Preferably, the ridged dough 12 made by any method will have the increased surface area, cross-sectional area distribution and/or ridge-to-valley ratio parameters described above.

The dough tube formed by the die 20 may be cut to form a hollow annular ridged dough as shown in FIG. 1. The dough tube may be filled with a filling, cut and closed to form the filled product as shown in FIG. 2.

Although the present invention has been described with reference to preferred embodiments, workers skilled in the art will recognize that changes may be made in form and detail without departing from the spirit and scope of the invention.

What is claimed is:

1. A method for making a cooked ridged dough having a moisture gradient between an outer surface with a percent moisture of not more than about 10% by weight and an unridged inner surface with a percent moisture of not more than about 25% by weight comprising the steps of:

preparing a dough having a percent moisture of about 20 to 35% by weight;

processing the dough with a means for providing ridges and valleys on the outer surface of the dough wherein the dough has a surface area about 10% to 200% greater than a same weight of dough without ridges; and cooking the dough to make a ridged cooked dough product having a moisture gradient between the unridged inner surface and ridged outer surface.

2. The method of claim 1 wherein the ridges increase the surface area of the outer surface of the ridged dough by between about 20% and 100% as compared to a surface lacking ridges.

3. The method of claim 1 wherein the ridges increase the surface area of the outer surface of the ridged dough by between about 35% and 45% as compared to a surface lacking ridges.

4. The method of claim 1 wherein the ridges and valleys are separated by a ridge-to-valley height ratio of between about 1.5:1 to 8:1.

5. The method of claim 4 wherein the ridge-to-valley height ratio is between about 2:1 to 6:1.

6. The method of claim 1 wherein up to about 95% of the cross-sectional area of the dough is in the ridges.

7. The method of claim 1 wherein between about 55 and 85% of the cross-sectional area of the dough is in the ridges.

8. A method for making a filled cooked dough product, comprising the steps of:

preparing a dough having a moisture content of about 20 to 35% by weight;

providing a filling;

co-extruding the dough and filling to form a dough tube enclosing the filing, the dough tube having an outer surface comprising a plurality of ridges and valleys and an unridged inner surface; and cooking the co-extruded dough and filling so that the outer surface has a percent moisture of not more than about 10% by weight and the inner surface has a percent moisture of note more than about 25% by weight, creating a moisture gradient between the outer surface and inner surface.

9. The method of claim 8, wherein the ridges increase the surface area of the outer surface by between about 10% and 200% as compared to an outer surface lacking ridges.

10. The method of claim 8, wherein the ridges increase the surface area of the outer surface by between about 20% and 100% as compared to an outer surface lacking ridges.

11. The method of claim 8, wherein the ridges increase the surface area of the outer surface by between about 35% and 45% as compared to an outer surface lacking ridges.

12. The method of claim 8 wherein the ridge and valley are separated by a ridge-to-valley height ratio of between 1.5:1 to 8:1.

13. The method of claim 12 wherein the ridge-to-valley height ratio is between about 2:1 to 6:1.

14. The method of claim 8 wherein up to about 95% of the cross-sectional area of the dough is in the ridges.

15. The method of claim 8 wherein between about 55% and 85% of the cross-sectional area of the dough is in the ridges.

16. A cooked ridged dough having an outer surface with ridges and valleys and an unridged inner surface wherein the ridges increase the outer surface area by between about 10% and 200% as compared to an outer surface lacking ridges and further wherein the cooked ridged dough has a moisture gradient, between the inner surface with a moisture that is not more than 25% by weight and the outer surface with a moisture that is not more than 10% by weight.

17. The cooked ridged dough of claim 16 wherein the surface area is increased by between about 20% to 100%.

18. The cooked ridged dough of claim 16 wherein the surface area is increased by between about 35% and 45%.

19. The cooked ridged dough of claim 16 wherein the ridges and valleys have a ridge-to-valley height ratio of between about 1.5:1 and 8:1.

20. The cooked ridged dough of claim 16 wherein the ridges and valleys have a ridge-to-valley height ratio of between about 2:1 and 6:1.

21. The cooked ridged dough of claim 16 wherein up to about 95% of the cross-sectional area of the dough is in the ridges.

22. The cooked ridged dough of claim 16 wherein between about 55% and 85% of the cross-sectional area of the dough is in the ridges.

23. The cooked ridged dough of claim 16 wherein the dough is filled.

24. A cooked ridged filled dough product having ridges and valleys on an outer surface of the dough and an inner unridged surface, wherein the ridges increase the outer surface area by between about 10% and 200% as compared to an outer surface lacking ridges, the cooked ridged filled dough has a moisture gradient between the inner surface with a moisture that is not more than 25% by weight and the outer surface with a moisture that is not more than 10% by weight and a filling enrobed by the dough.

25. The cooked ridged filled dough product of claim 24 wherein the filling has a water activity of up to about 0.98.

26. The cooked ridged filled dough product of claim 24 wherein the filling is selected from the group consisting of egg roll ingredients, pizza ingredients, burrito ingredients, casserole ingredients and pie ingredients.

27. The cooked ridged filled dough product of claim 24 further comprising a coating on the outer surface of the dough.

* * * * *

UNITED STATES PATENT AND TRADEMARK OFFICE
CERTIFICATE OF CORRECTION

PATENT NO. : 5,538,744
DATED      : July 23, 1996
INVENTOR(S) : Dianne M. Miller; Simon A. Almaer; Jeremy A. Heintz It is certified that error appears in the above-indentified patent and that said Letters Patent is hereby corrected as shown below:

Col. 7, line 65, delete the word "note" and insert the word -- not --

Signed and Sealed this

Twelfth Day of November, 1996

Attest:

BRUCE LEHMAN

*Attesting Officer*    *Commissioner of Patents and Trademarks*